Figure 1:
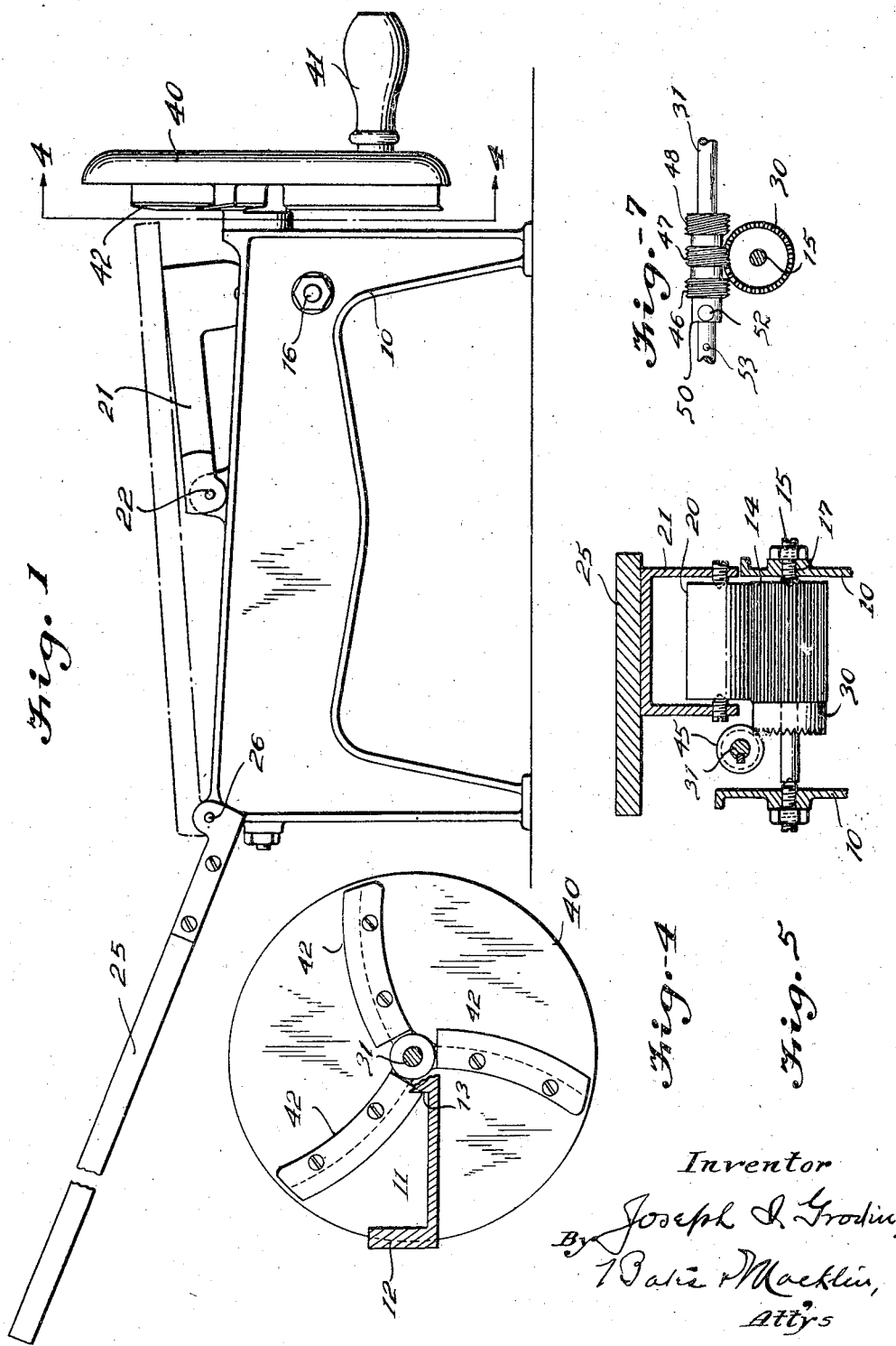

Patented Feb. 19, 1924.

1,484,262

UNITED STATES PATENT OFFICE.

JOSEPH I. GRODIN, OF EAST CLEVELAND, OHIO.

CUTTING MACHINE.

Application filed April 12, 1922. Serial No. 551,754.

*To all whom it may concern:*

Be it known that I, JOSEPH I. GRODIN, a citizen of the United States, residing at East Cleveland, in the county of Cuyahoga and State of Ohio, have invented a certain new and useful Improvement in a Cutting Machine, of which the following is a full, clear, and exact description, reference being had to the accompanying drawings.

This invention relates to improvements in cutting machines, particularly to those which are adapted for use in cutting food into strips, as noodles, for instance, One of the objects of my invention is the provision of means for regulating the relative speed with which the material is fed to the cutters, and the construction of adjusting mechanism which may be quickly altered, to vary the depth of cut desired. My invention contemplates, also, an adjusting means which may be conveniently installed in existing cutting machines.

My invention is particularly applicable to a machine wherein the material to be cut is fed down a runway and is controlled by a serrated roller which regulates the relative speed with which the material is fed against the rotary cutting knives. The means for controlling the speed of the serrated roller constitutes an important part of my invention, as will be hereinafter described in connection with the embodiment illustrated in the drawings. The essential features will be summarized in the claims.

Figure 2:
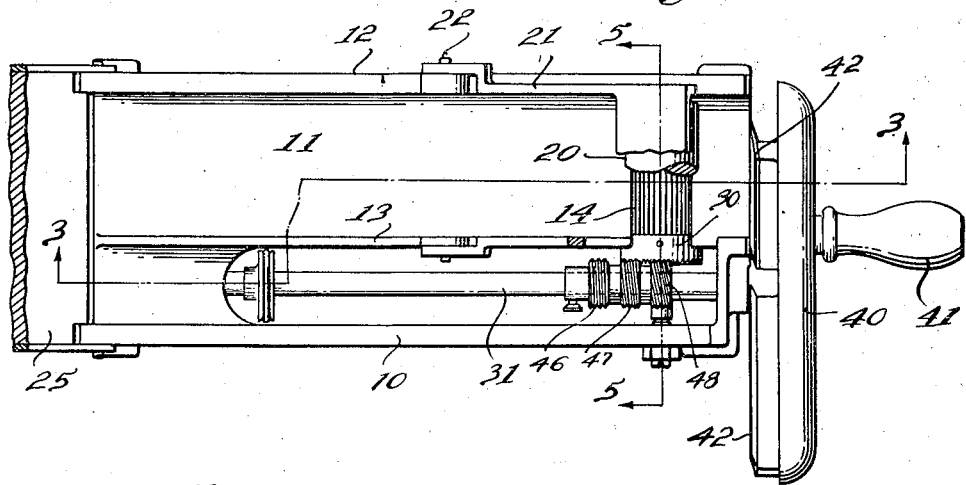
Figure 3:
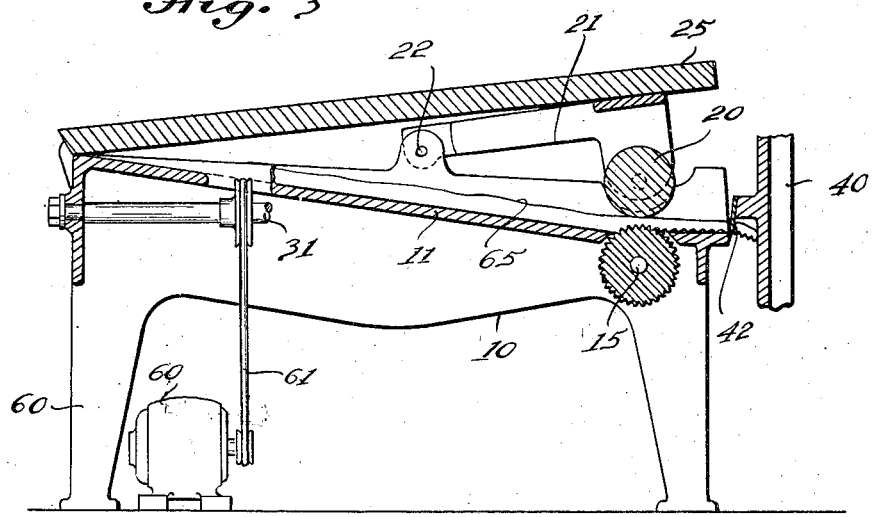
Figure 6:
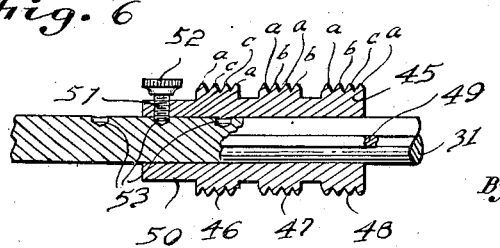

In the drawings, Fig. 1 is a side elevation of a machine to which my invention is applicable; Fig. 2 is a plan view thereof with the cover removed; Fig. 3 is a vertical section taken longitudinally through the machine; Figs. 4 and 5 are sections taken on the lines 4—4 and 5—5 in Figs. 1 and 2 respectively; Fig. 6 is an enlarged view showing the adjustable feed mechanism; and Fig. 7 is a view showing the feed mechanism removed from the machine.

Designating the parts shown in the drawings by the use of reference characters, 10 indicates the bed of a cutting machine having an inclined runway 11, for receiving material to be cut, and having suitable guides 12 and 13 at either side of the runway and extending substantially the entire length thereof. Adjacent the lower end of the runway I have shown a serrated feed roll 14, which is mounted on a shaft 15 extending transversely of the runway and supported, as at 16 and 17, by the machine bed 10.

The material to be cut may be held in engagement with the feed roll by a guide roll 20, which is carried within a yoke 21. This yoke in turn may be pivoted at 22 to the guides 12 and 13 respectively. The guide roll is adapted to be held in engagement with the material to be cut by means of a cover 25, which is pivoted at 26 to the bed adjacent the upper end of the runway. This cover may also serve as a support for holding long strips of material to be cut.

To operate the feed roll I have shown a worm wheel in the nature of a tubular member 30 which is secured at the end of the feed roll, and which is provided with teeth for engaging a worm 45 on a shaft 31. This shaft may extend longitudinally of the machine and be supported by the bed near the ends of the runway, and be operable by a hand wheel 40, which is provided with a handle 41. The wheel 40 serves as a fly wheel and also as a cutting element, as indicated by the knives 42, which are radially mounted on the side of the wheel adjacent the runway.

The shaft 31 is preferably offset from the teeth in the worm wheel 30, as indicated in Fig. 5 for enabling the worm 45 to be provided with a plurality of sections having teeth of different pitch, as indicated at 46, 47 and 48 respectively.

A preferred manner of securing the variable feed is to make the threads single, double and triple pitch, as indicated in Figs. 2 and 6; the single threads being indicated at $a$, the double at $a$ and $b$, the triple at $a$, $b$ and $c$, on the sections indicated at 46, 47 and 48 respectively. By reason of the offset position of the shaft 31 with relation to the feed roll, a satisfactory inter-engagement may be obtained between the worm and worm wheel, even though the teeth on the various sections are of different pitch.

To enable the feed adjustment to be readily accomplished, I have shown the worm 45 splined, as at 49, to the shaft 31, and as having an extension 50 projecting from one end of the worm. This extension may be threaded to receive a set screw 51 which is adapted to engage recesses 53 in the shaft 31. A knob 52 enables the set screw to be manually turned with slight effort, whereby the inner end thereof may be brought into engagement with another recess for causing a different pitched section to engage the worm wheel.

I have described the machine as equipped with a manually operable cutting element but the arrangement of the feed mechanism enhances the adaptability for an electric driving means which is directly connected to the shaft 31. Such an installation is indicated in Fig. 3 wherein the motor is designated 60, and is arranged to operate a belt 61, which in turn drives a pulley 62 on the shaft 31.

The operation of a machine equipped with my invention is as follows: Assuming that the material to be cut, indicated at 65, is placed in the runway, then while the operator holds the guide roll downwardly with one hand, he grasps the handle 41 with the other and turns the wheel 40. This rotates the shaft 31, and by reason of the inter-engagement between the worm and worm wheel connection, rotates the feed roll 14, thus drawing material between the feed and guide rolls and forcing it against the cutting knives on the inner face of the hand wheel.

When it is desired to vary the depth of the cut, the operator releases the set screw 51 from engagement with one of the notches 53 and slides the worm along the shaft 31. As the worm 45 is moved along the shaft, the feed roll rotates until the next succeeding section is brought into engagement with the teeth on the worm wheel. Then the set screw may be turned in the opposite direction to engage the adjacent recess, thus holding the worm in the new position.

From the foregoing description it will be seen that my invention provides for an adjustable feed which may be quickly and easily varied in accordance with the depth of the cut required. In addition, my invention may be easily incorporated in existing machines and be operable for satisfactorily regulating the depth of cut when the mechanism is controlled either by the hand or by electrically operated means.

Having thus described my invention I claim:

1. In combination, a frame, an inclined runway thereon, a feed roll extending transversely thereof and adjacent one end of the runway, a shaft mounted transversely of the feed roll and offset therefrom, a rotary cutter mounted on the shaft, a hand wheel for operating the cutter and sets of worms having different pitch on said shaft, for operating the feed roll, and means for selectively engaging the worms with the feed roll whereby relative motion between the feed roll and the cutter may be controlled.

2. In combination, an inclined runway, a serrated feed roll mounted beneath the runway and protruding slightly thereabove, a shaft mounted transversely of the feed roll, sets of worms having single, double and triple pitch threads thereon respectively, for operating the worm wheel, a rotary cutter mounted on said shaft adjacent the end of the runway, and means whereby relative movement of the cutter and feed roll may be selectively controlled.

3. In combination, a frame, an inclined runway carried thereby, a feed roll mounted on the frame adjacent the runway, a drive shaft carried by the frame outside the runway and transversely of the feed roll, a worm and worm wheel connection between the drive shaft and roll, a rotary cutter adjacent the end of the runway, said cutter being operatively connected with said drive shaft, and a plurality of sets of teeth of different pitch associated with said worm.

4. In combination, a frame, an inclined runway thereon, a serrated feed roll adjacent the lower end of the runway, a worm wheel carried by said roll, a drive shaft extending transversely of the roll, a plurality of worms on said shaft, a rotary cutter mounted on said shaft outside the runway, and means for selectively inter-engaging any of said worms with said worm wheel.

5. In combination, a runway, a serrated feed roll adjacent one end of the runway, a guide roll pivoted above the feed roll, a worm wheel carried by the feed roll, a drive shaft extending transversely of the wheel and having a member slidable thereon, worm teeth on said member, means for causing an inter-engagement between said worm wheel and any one of said worm teeth, and a cutter mounted on said shaft adjacent one end of the runway.

6. In a device of the character described, the combination with a runway, of a feed roll positioned adjacent one end thereof, a worm wheel associated with said roll, a shaft offset from the worm wheel and mounted transversely thereof, a member slidable longitudinally of the shaft and rotatable therewith, sets of worm teeth having different pitch thereon, means for selectively causing an inter-engagement between the worm wheel and any one of said sets of worm teeth, a hand wheel carried by said shaft outside the runway, and a rotary cutter mounted on the hand wheel.

7. In a device of the character described, the combination of a runway having a feed roll extending transversely thereof, a worm wheel mounted below the runway and having portions protruding above the runway, a drive shaft having spaced recesses therein mounted transversely of the feed roll, a worm slidable longitudinally of the drive shaft and rotatable therewith, said worm having sets of teeth of different pitch thereon, a threaded member carried by said worm and adapted to cooperate with said recesses for retaining the worm in operative position on said shaft, and a rotary cutter mounted on the shaft adjacent the end of the runway.

8. In a device of the character described, the combination with a frame, of an inclined runway thereon, a feed roll adjacent the lower end of the runway, a shaft extending longitudinally of the runway and having a plurality of notches therein, a worm slidable on said shaft, a worm wheel carried by the feed roll and adapted to be operatively connected with said worm, a member carried by the worm and adapted to cooperate with said notches for retaining the worm against movement axially, relative to the shaft, and means for rotating the shaft.

9. In a device of the character described, the combination with a frame, of an inclined runway thereon, a feed roll mounted transversely of the frame and adjacent one end of the runway, a drive shaft extending longitudinally of the frame, a worm slidable on the drive shaft and rotatable therewith, a worm wheel carried by the feed roll and adapted to be engaged by said worm, said worm having a plurality of sets of teeth of different pitch thereon and having a non-threaded portion extending from one end thereof, said drive shaft having a plurality of aligned notches therein, a set screw extending through the non-threaded portion of the worm and adapted to engage the notches for preventing movement of the worm axially and relative to said shaft.

In testimony whereof I hereunto affix my signature.

JOSEPH I. GRODIN.